US011112496B2

(12) United States Patent
Diewald

(10) Patent No.: US 11,112,496 B2
(45) Date of Patent: Sep. 7, 2021

(54) POSITION-DETERMINING DEVICE

(71) Applicant: IEE INTERNATIONAL ELECTRONICS & ENGINEERING S.A., Echternach (LU)

(72) Inventor: Andreas Diewald, Kell am See (DE)

(73) Assignee: IEE INTERNATIONAL ELECTRONICS & ENGINEERING S.A., Echternach (LU)

(*) Notice: Subject to any disclaimer, the term of this patent is extended or adjusted under 35 U.S.C. 154(b) by 388 days.

(21) Appl. No.: 16/065,857

(22) PCT Filed: Dec. 22, 2016

(86) PCT No.: PCT/EP2016/082475
§ 371 (c)(1),
(2) Date: Jun. 25, 2018

(87) PCT Pub. No.: WO2017/114762
PCT Pub. Date: Jul. 6, 2017

(65) Prior Publication Data
US 2019/0011546 A1 Jan. 10, 2019

(30) Foreign Application Priority Data

Dec. 31, 2015 (DE) ...................... 10 2015 017 027.9
Oct. 12, 2016 (DE) ...................... 10 2016 119 484.0

(51) Int. Cl.
*G01S 13/00* (2006.01)
*G01S 13/87* (2006.01)
(Continued)

(52) U.S. Cl.
CPC .......... *G01S 13/003* (2013.01); *G01S 13/878* (2013.01); *G01S 2013/466* (2013.01);
(Continued)

(58) Field of Classification Search
CPC .... G01S 5/0249; G01S 5/0295; G01S 13/003; G01S 13/878
See application file for complete search history.

(56) References Cited

U.S. PATENT DOCUMENTS 6,545,633 B1 4/2003 Jensen
2003/0222778 A1 12/2003 Piesinger
(Continued)

FOREIGN PATENT DOCUMENTS

DE 4120397 A1 12/1992
DE 102010045657 A1 3/2012

OTHER PUBLICATIONS

International Search Report for International application No. PCT/EP2016/082475, dated Mar. 21, 2017, 3 pages.
(Continued)

*Primary Examiner* — Dao L Phan
(74) *Attorney, Agent, or Firm* — Reising Ethington P.C.

(57) ABSTRACT

A position determining device for determining the position of an object with reference to the position determining device, the position determining device encompassing: a transmitting device at a first location; a receiving device at a second location, the receiving device being configured for reception of a transmitted signal from the first transmitting device, and for determination of a transit time of the transmitted signal from the transmitting device to the object and from the object to the receiving device, the first location and the second location being at a distance from one another, and the position determining device being configured to determine, from the transit time, an ellipse on which the object lies and which has the first location and the second location as foci.

14 Claims, 6 Drawing Sheets

(51) Int. Cl.
    *G01S 13/46*         (2006.01)
    *G01S 13/931*        (2020.01)
(52) U.S. Cl.
    CPC ............... *G01S 2013/93271* (2020.01); *G01S 2013/93272* (2020.01); *G01S 2013/93274* (2020.01)

(56) References Cited

U.S. PATENT DOCUMENTS

2007/0176822 A1   8/2007   Shirakawa
2013/0162461 A1   6/2013   Lucking et al.

OTHER PUBLICATIONS

Written Opinion for International application No. PCT/EP2016/082475, dated Dec. 22, 2016, 8 pages.

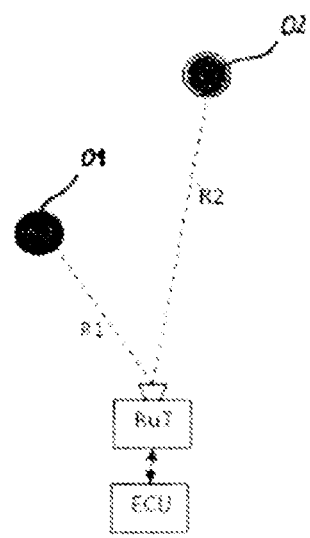
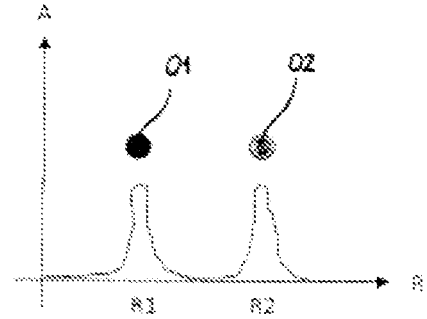
Fig. 1A          Fig. 1B
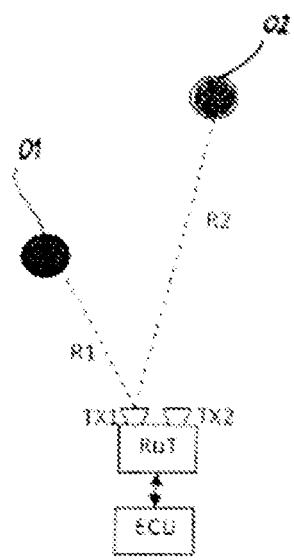
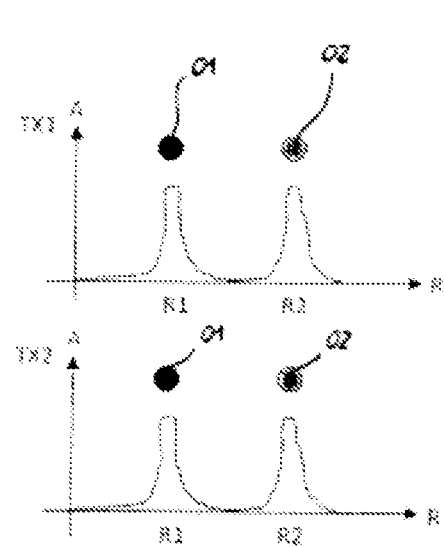
Fig. 2A          Fig. 2B

POSITION-DETERMINING DEVICE

This invention relates to a position determining device for determining the position of an object with reference to the position determining device, the position determining device encompassing a transmitting device at a first location and a receiving device at a second location. The receiving device is configured for reception of a transmitted signal from the first transmitting device, and for determination of a transit time of the transmitted signal from the transmitting device to the object and from the object to the receiving device. The invention further relates to a method for determining the position of an object.

It has been known for some time in the existing art to sense an object by means of a radar range measuring device and to ascertain the range between the object and the radar range measuring device from the transit time of a signal from the radar range measuring device to the object and back to the radar range measuring device. This is possible using a single antenna that is used for transmission and for reception. A range can furthermore be determined by transmitting and receiving a continuous wave signal with a frequency modulation.

A speed of an object can be measured based on time series measurements and/or by way of the Doppler effect. It is possible to distinguish various objects from one another by way of their differing speeds, as long as their speeds with reference to the radar range measuring device are not identical. FIG. 1A schematically shows this existing art.

Radar pulses are emitted from a receiver and transmitter RuT to objects O1 and O2 that are depicted as solid black circles, object O2 additionally being depicted with a black circle around the periphery.

A "pulse" is understood in this patent application as a signal change in the signal profile, e.g. a peak, a rectangular or triangular profile or a sine half-wave or an approximation thereto, or a rising and falling, or falling and rising, change in amplitude of some other shape in the signal profile. A pulse can encompass one signal deflection, but also several contiguous ones. The duration of the pulse is short as compared with the duration of the entire signal.

Objects O1 and O2 are at ranges R1 and R2 from receiver and transmitter RuT. Receiver and transmitter RuT is controlled from an electronic control unit ECU that also accepts the received signals.

FIG. 1B shows, in a diagram of amplitude values A plotted against transit time, the signals that are received back by the same antenna after a pulse is emitted, and that contain information regarding the range R of objects O1 and O2 from receiver and transmitter RuT. Different object ranges can be associated with different received pulses.

In many instances it is desirable also to know the angular position of an object with respect to the radar range measuring device. With the variant depicted in FIG. 1A this is possible, for example, by rotating the antenna. The "monopulse" method (also called "angle of arrival" or "direction of arrival" method) is known in the existing art; in this, two antennas having a constant and superimposed radiation and reception region, which are at a distance D from one another, are used to sense the angular position of an object. That distance D is usually half a wavelength, i.e. approximately 6.25 mm at 24 GHz.

The two antennas transmit at the same frequency. The received signals of the two antennas are coherently mixed down with the transmitted signal. The phase delays of the two received signals can thereby be measured, and from them the angle of incidence of the reflected wave can be ascertained, being contained in the phase difference $\Delta\phi$ between the pulses of the same object received respectively by an antenna. The angle of incidence $\alpha$ can be calculated as follows:

$$\sin\alpha = \frac{\Delta\Phi \cdot c_0}{\omega \cdot d}$$

where $c_0$ is the speed of light and $\omega$ the angular velocity of the transmission frequency.

The configuration of such a system is depicted in FIG. 2A. There are only slight differences in configuration compared with the variant shown in FIG. 1A. Identical features are labeled with identical reference numbers, and are not individually described again. As already mentioned, receiver and transmitter RuT encompasses two antennas TX1 and TX2. FIG. 2B shows two diagrams with signals that are received at antennas TX1 and TX2, respectively depicting the amplitude A of the returned signal plotted against range R.

If several objects are to be tracked using such a system, in order for this method to be used the objects must be separated from one another so that the phase shift between reflected signals from the same object can be determined. There are situations, however, in which the objects cannot be unequivocally separated from one another using this method. If several objects are located at the same distance when measuring a static scene, for instance, a direction can no longer be determined because the pulses overlie one another upon reception. A determination of the angular position of several objects using the monopulse method is therefore not possible in every situation. Beam-sweeping methods, or also digital beam-shaping methods using a plurality of antennas, are possible in order to achieve reliable resolution in an angular direction.

A further possibility for ascertaining range and angle is offered by the trilateration method, in which two antennas, each of which is fed by a separate oscillator, are used. An oscillator of this kind preferably operates at a very stable frequency. The oscillators are not synchronized with one another. They can run at different frequencies so as not to interfere with one another. The antennas are preferably at a greater distance D from one another as compared with the monopulse method. This makes possible a smaller angle calculation error.

FIG. 3A shows the configuration of a measurement device that uses the trilateration method. Identical features have the same numbers and are not separately described again. An angle $\alpha$ exists between a central emission direction of receiver and transmitter unit RuT1 and the angular direction to object O1, while an angle $\beta$ exists between a central emission direction of receiver and transmitter unit RuT2 and the angular direction to object O1. The different angles $\alpha$ and $\beta$ result in different ranges R1 and R2 between receiver and transmitter units RuT1 and RuT2 and object O1, and thus also in different transit times for the reflected pulses in the received signals. Receiver and transmitter units RuT1 and RuT2 are located respectively at locations X1 and X2, and are at a distance D from one another. The received signals of receiver and transmitter units RuT1 and RuT2 are depicted in FIG. 3B.

The angle $\alpha$ can be calculated from the triangle made up of R1, R2, and D, as follows:

$$\sin\alpha = \frac{d}{2 \cdot R1} + \frac{R1}{2 \cdot D} - \frac{R2^2}{2 \cdot D \cdot R1}$$

The angle β can be calculated as follows:

$$\sin\beta = \frac{d}{2 \cdot R2} + \frac{R2}{2 \cdot D} - \frac{R1^2}{2 \cdot D \cdot R2}$$

Here as well, an unequivocal identification of the object must take place before the angle is ascertained, in order to ensure that the line segments R1 and R2 belong to the same object. As in the case of the monopulse method, however, with a trilateration method of this kind there also exist constellations in which an unequivocal allocation is not possible. Such a constellation is shown in FIG. 4A. Here object O1 is at range R' from receiver and transmitter unit RuT1, and object O2 is at range R2" from receiver and transmitter unit RuT2, ranges R1' and R2" being of identical magnitude. Furthermore, object O2 is at range R1" from receiver and transmitter unit RuT1, and object O2 is at range R2' from receiver and transmitter unit RuT2, ranges R1" and R2' again being of equal magnitude. In this situation, objects O1 and O2 can indeed be distinguished from one another but their positions are in no way unequivocal, as shown by a comparison with the constellation depicted in FIG. 5A. In FIG. 5A the ranges R1' and R1" existing between object O1 and receiver and transmitter unit RuT1, and the ranges R2' and R2" existing between object O2 and receiver and transmitter unit RuT2, are the same as in FIG. 4A. It can be deduced therefrom that for N unequivocally detectable objects, there exist N! (factorial of N) possibilities for allocation. Not all conceivable positions of two objects with reference to a measuring device operating with the trilateration method are equivocal, however.

DESCRIPTION OF THE INVENTION

Regardless of the invention presented below, it is proposed as an independent invention to track the positions of the objects and to deduce from previous positions, in an equivocal constellation, which of the possible constellations is the correct one, exploiting the fact that objects are always located on an uninterrupted trajectory. The position determination is preferably carried out sufficiently frequently that it is not to be expected that more than one possible constellation will be passed through within a time period between two position determinations.

Alternatively thereto, another embodiment of the invention is a position determining device for determining a position of an object with reference to a position measuring device.

The position determining device is suitable in particular for allocating a received signal to a specific object. It is thereby possible, when several objects are present, to determine the correct positional constellation for the objects, in particular for two objects, from several, in particular two, such constellations. The position determining device encompasses for that purpose a transmitting device at a first location and a receiving device at a second location. The receiving device is configured to receive a transmitted signal from the first transmitting device, and to determine a transmit time of the transmitted signal from the transmitting device to the object and from the object to the receiving device. According to an embodiment of the present invention, the first location and the second location are at a distance from one another, and the position determining device is configured to determine, from the transit time, an ellipse on which the object lies. If measurement is occurring in three dimensions, it is then also possible to determine an ellipsoid.

The transit time can be determined using known methods, for instance by phase comparison between the transmitted signal and received signal, by modulating the transmitted signal and mixing a received signal with a signal in order to mix down and extract the transit time information, by interferometry, by encoding the transmission point in time in the transmitted signal and comparing it with the reception point in time, and by using further methods known in dimensional metrology. The method can be carried out, for example, optically, using ultrasound, or preferably using electromagnetic radio waves, in particular radar waves.

The position determining device, or a corresponding method, supplies a position of the object, which can be determined from the total travel distance of the transmitted signal from the transmitter to an object and from there to the receiver which is located at a different location from the transmitter. The distance and positions of the transmitter and of the receiver can also be incorporated in this context. If that distance is fixed, the distance can be incorporated by embedding it into an algorithm, or into signal processing steps implemented in hardware, which determine the ellipse from the transit time. A position of an object lies on an ellipse that has the transmitter and the receiver as foci. Once the path length from the transmitter via the object to the receiver, which is located at a different point, is determined from the transit time, it is possible to determine the ellipse on which the object must lie.

It is apparent to one skilled in the art that it is not necessarily to calculate explicitly in terms of path lengths, but that other magnitudes that contain the same information can also be used. An ellipse can be defined unequivocally by way of two mutually independent parameters, this being common knowledge in mathematics. For example, the distance of the transmitter and receiver from one another, and the ascertained path length from the transmitter via the object to the receiver, can serve as those two parameters. If the distance of transmitter and receiver from one another is constant, there is only one variable parameter which unequivocally defines the ellipse. Once the transmitter and receiver are fixed with respect to one another, it is thus sufficient to determine the path length from the transmitter via the object to the transmitter in order to identify the ellipse on which the object is located. For example, a transmitting device and a receiving device can be mounted, nondisplaceably with respect to one another, at different points on a vehicle.

The position of the object on the ellipse cannot be identified unequivocally based on the two parameters of an ellipse, since the path length connecting the foci via a point on the ellipse curve is the same for all points on the ellipse curve. This is a commonly known property of an ellipse which can be found in relevant mathematics textbooks. Although the position of the object cannot be identified unequivocally, it is possible to identify unequivocally the ellipse on which it lies. It is thus possible to distinguish objects that have been identified as lying on a specific ellipse from objects that lie on a different ellipse. It is thereby possible to distinguish, for instance in a trilateration method in a situation with an equivocal constellation of several objects, the constellation that is the real one.

These observations can be expanded from the plane of an ellipse out into three dimensions if what is considered is not an ellipse but rather an ellipsoid having the transmitting device and the receiving device in the foci. This results in fundamentally no change in the considerations above. A plane having an ellipse can be defined for every object by way of its position on the ellipsoid surface and the two foci.

The first receiving device and the first transmitting device, and/or the second receiving device and the second transmitting device, are preferably respectively combined into a receiver and transmitter unit in which the transmitting device and receiving device are arranged at the same location. A location is also intended to be considered "the same" if the transmitting device and the receiving device use separate antennas that are arranged in the vicinity of one another, for instance at a distance from one another of less than 25 cm, which is a suitable value, for instance, for determining the positions of objects in the surroundings of a vehicle. In another variant, a single antenna of a receiver and transmitter unit can also be provided for transmitting and for receiving.

The method can be configured as a radar technology method, but it is also possible to use it analogously for other non-contact range measurements, for example optical or acoustic measuring methods. The oscillators then correspond to light sources. The transmission frequency is preferably modulated.

The position determining device can also be operated with more than two transmitters and more than two receivers. The number of transmitters preferably corresponds to the number of receivers.

In an embodiment, the position determining device furthermore encompasses a first transmitting device at the first location and a first receiving device at the first location. These can be combined into one receiver and transmitter unit and can use separate antennas or one common antenna. The first receiving device generates a first received signal from a transmitted signal of a second transmitting device. The second transmitting device is arranged at a second location at which a second receiving device is also arranged. The latter can be combined into one receiver and transmitter unit and can use separate antennas or one common antenna. The second receiving device generates a second received signal from a transmitted signal of the first transmitting device. An illumination region of the first transmitting device overlaps an illumination region of the second transmitting device, an object being located in the overlap region in the context of a position determination.

The first transmitting device transmits at a first transmission frequency and the second transmitting device transmits at a second transmission frequency, the first transmission frequency differing from the second transmission frequency by a frequency difference. The first and the second transmission frequency are preferably frequency-modulated in the same manner, so that the frequency difference remains constant. The modulation frequency and/or the frequency difference are preferably in the region between 1 kHz and 1 GHz, in which they can be processed with conventional electronics when they are separated from the transmission frequency in order to determine a position. The transmission frequency is preferably higher than 1 GHz. The first and the second transmission frequency are preferably linearly frequency-modulated, in particular using repeating ramps. Alternatively or additionally, a phase modulation can also be carried out. The modulation can be, for example, a harmonic modulation of the first and the second transmission frequency, or a modulation with a digital signal. Preferably the frequency difference is kept highly constant, for example by using a phase locked loop (PLL) circuit known in the existing art. Oscillators of the first and the second transmission frequency can be incoherent. The position determining device furthermore encompasses a first receiving device at the location of the first transmitting device, for receiving signals from the second transmitting device and for generating a first received signal, and a second receiving device at the location of the second transmitting device, for receiving signals from the first transmitting device and for generating a second received signal.

Frequency modulation of the first and of the second transmission frequency preferably takes place in the same manner. This has the advantage that the transit time information that is preferably associated with the frequency modulation of the transmitting frequency is contained similarly in the first and in the second received signal, which can be advantageous in terms of signal processing. For example, an average can be calculated in order to increase accuracy.

The position determining device furthermore encompasses a first received signal mixing device for mixing the first received signal with the first transmitted signal in order to generate a first intermediate signal, and a second received signal mixing device for mixing the second received signal with the second transmitted signal in order to generate a second intermediate signal. The first received signal mixing device is preferably part of a receiver and transmitter unit that also encompasses the first transmitting device and the first receiving device, in particular in the same housing. Analogously, the second received signal mixing device is preferably part of a receiver and transmitter unit that also encompasses the second transmitting device and the second receiving device, in particular in the same housing.

The mixing operation is a mixing of two signals that can be described by the following trigonometric theorem:

$$\cos(x) \cdot \cos(y) = \frac{1}{2}(\cos(x-y) + \cos(x+y))$$

It is apparent here that the result is a sum of two cosine functions. In the first term, the argument of the cosine function is a subtraction of the original arguments x and y. This term is referred to as a "subtractive mixed term." The other term is analogously referred to as an "additive mixed term," in which the argument of the cosine function is an addition of the original arguments x and y.

The first transmitted signal can be described by the following formulation:

$$SS1 = \cos(2 \cdot \pi \cdot f0(t) \cdot t + \Phi 1)$$

In this, SS1 denotes the first transmitted signal, $f0(t)$ a time-modulated transmission frequency, and $\Phi 1$ an associated first phase shift.

The second transmitted signal can be described by the following formulation:

$$SS2 = \cos(2 \cdot \pi \cdot (f0(t) + \Delta f) \cdot t + \Phi 2)$$

In this, SS2 denotes the second transmitted signal, $\Delta f$ the frequency difference, and $\Phi 1$ an associated second phase shift.

The first received signal can be described by the following formulation:

$$ES1 = k11 \cdot \cos(2 \cdot \pi \cdot f0(t) \cdot (t-T11) + \Phi 1) + k12 \cdot \cos(2 \cdot \pi \cdot (f0(t) + \Delta f) \cdot (t-T11) + \Phi 2)$$

In this, ES1 denotes the first received signal, k11 a damping factor resulting from transfer from the first transmitting device to the first receiving device, k12 a damping factor resulting from transfer from the second transmitting device to the first receiving device, T11 a transit time for transfer from the first transmitting device via an object to the first receiving device, and T12 a transit time for transfer from the second transmitting device via an object to the first receiving device. The first term in the mixed term describes that portion of the first received signal which is received from the first transmitting device, which is arranged at the same location as the first receiving device, while the second term describes that portion of the first received signal which is received from the second transmitting device, which is arranged at a different location from the first receiving device.

The second received signal can be described by the following formulation:

$$ES2 = k21 \cdot \cos(2\pi \cdot f)(t) \cdot (t - T21) + \Phi1) + k22 \cdot \cos(2\pi \cdot (f0(t) + \Delta f) \cdot (t - T21) + \Phi2)$$

In this, ES2 denotes the second received signal, k21 a damping factor resulting from transfer from the first transmitting device to the second receiving device, k22 a damping factor resulting from transfer from the second transmitting device to the second receiving device, T21 a transit time for transfer from the first transmitting device to the second receiving device, and T22 a transit time for transfer from the second transmitting device to the second receiving device. The first term describes that portion of the second received signal which is received from the first transmitting device, which is arranged at the same location as the first receiving device, while the second term describes that portion of the first received signal which is received from the second transmitting device, which is arranged at a different location from the first receiving device.

Applying multiplicative mixing of the first received signal with the first transmitted signal yields the following formulation for the subtractive mixed term of the first intermediate signal:

$$ZS1SMT = k\frac{11}{2} \cdot \cos(2 \cdot \pi \cdot f0(t) \cdot T11) + k\frac{12}{2} \cdot \cos(2 \cdot \pi \cdot (f0(t) + \Delta f) \cdot T12 - 2 \cdot \pi \cdot \Delta f \cdot t + \Phi1 - \Phi2)$$

In this, ZS1SMT denotes the subtractive mixed term of the first intermediate signal. This encompasses two terms. The first of these is a quasi-dynamic term whose dynamics depends exclusively on the modulation of the transmission frequency. This term contains information regarding the range of the object from the first transmitting device, which is arranged at the same location as the first receiving device. This term is called the "first direct component." The second term is a dynamic term whose dynamics depends both on the modulation of the transmission frequency and directly on time as an argument of the cosine function. This term contains information regarding the transit time from the second transmitting device to the object, and from there to the first receiving device. This term is called the "first transverse component."

Applying multiplicative mixing of the second received signal with the second transmitted signal yields the following formulation for the subtractive mixed term of the second intermediate signal:

$$ZS2SMT = k\frac{21}{2} \cdot \cos(2 \cdot \pi \cdot f0(t) \cdot T21 + 2 \cdot \pi \cdot \Delta f \cdot t - \Phi1 + \Phi2) + k\frac{22}{2} \cdot \cos(2 \cdot \pi \cdot (f0(t) + \Delta f) \cdot T22)$$

In this, ZS2SMT denotes the subtractive mixed term of the second intermediate signal. This encompasses two terms. The second of these is a quasi-static term whose dynamic portion depends exclusively on the modulation of the transmission frequency. This term contains information regarding the range of the object from the second transmitting device, which is arranged at the same location as the second receiving device. This term is called the "second direct component." The first term, which denotes reception from the transmitting device at the different location from the receiving device, is a dynamic term whose dynamics depends both on the modulation of the transmission frequency and on the frequency difference, both of which are time-dependent variables in the argument of the cosine function. This term contains information regarding the transit time from the first transmitting device to the object, and from there to the second receiving device. This term is called the "second transverse component."

The subtractive mixed term of the first intermediate signal corresponds largely to the subtractive mixed term of the second intermediate signal. The frequency difference is present in the subtractive mixed term of the two intermediate signals in each case in the dynamic term, this being the first and the second transverse term. In the subtractive mixed term of the first intermediate signal, the frequency difference is present in the dynamic term additionally as a static offset in the argument of the cosine function. In the subtractive mixed term of the second intermediate signal, the frequency difference is instead present in the quasi-static term as a static offset in the argument of the cosine function. These two terms are the first and the second in the direct component. In general, the transit times T12 and T21 and the damping coefficients k12 and k21 correspond to one another, since in general the direction in which the signal proceeds is not important in this context.

In this embodiment the position determining device furthermore encompasses an intermediate signal mixing device for mixing the first intermediate signal with the second intermediate signal in order to generate an ellipse determining signal. The intermediate signal mixing device is preferably a central unit that can mix at least two, preferably also more, intermediate signals with one another. In a variant, it can be arranged outside the receiver and transmitter units, and intermediate signal connections exist to the participating receiver and transmitter units. This approach can have advantages in terms of configuration, as compared with the plurality of intermediate signal connections that are possibly required between receiver and transmitter units. In another variant it is also conceivable for one intermediate signal mixing device to be arranged in one receiver and transmitter unit, or for several intermediate signal mixing devices to be arranged in several receiver and transmitter units. An additional unit is thereby avoided. Intermediate signal connections among receiver and transmitter units are then necessary.

Preferably it is not the entire first intermediate signal and the entire second intermediate signal that are mixed with one another, but instead only the respective transverse components of the subtractive intermediate signal mixed terms. These can previously be extracted from the intermediate signals. A specific frequency region of the intermediate signal can be used, for instance, for this purpose.

The ellipse determining signal can be represented as the following additive term:

$$EES = \frac{k12 \cdot k21}{8} \cdot \cos(2 \cdot \pi \cdot (f0(t) + \Delta f) \cdot T12 + 2 \cdot \pi \cdot f0(t) \cdot T21)$$

The ellipse determining signal is referred to as EES. If the ellipse determining signal is generated exclusively from the transverse terms, that is the only term of the ellipse determining signal. The ellipse determining signal contains information regarding the transit time from a transmitting device at one location to the object and from there to a receiving device at a different location, in both directions. The ellipse determining signal encompasses three terms in the argument of the cosine function. One of them, which encompasses the frequency difference, constitutes a phase term. The other two terms depend on the modulation of the transmission frequency.

Assuming that the transit times T12 and T21, i.e. the transit times in the forward and the reverse direction, are of equal magnitude and are referred to as T, the formulation of the ellipse determining signal can be simplified to:

$$EES = \frac{k12 \cdot k21}{8} \cdot \cos(2 \cdot 2 \cdot \pi \cdot f0(t) \cdot T + 2 \cdot \pi \cdot \Delta f \cdot T)$$

The transit time is present both in the phase term and in the dynamic term of the argument of the cosine function. Preferably the frequency of the dynamic term is evaluated, since this advantageously enables good accuracy and can be effectively evaluated.

Because the ellipse determining signal represents the sum of the ranges from the transmitting device to the object and from the object to the receiving device, which is arranged at a different location from the transmitting device, and because the distance between the transmitting devices of the receiving device is known and preferably fixed, a value of the ellipse determining signal can be unequivocally associated with a specific ellipse.

In a further embodiment, the position determining device encompasses a signal separating device for separating or filtering a component of a signal in the position determining device in order to further process a desired component of the signal. It is possible in principle to filter out portions of the spectrum of signals in order to retain and further process desired signal portions, or to divide a signal in order to further process, in different ways, the various portions thereby obtained. The various components of a signal differ in particular in terms of their frequency or their information content. This can also be utilized here.

The position determining device can in particular encompass a first low-pass filtering device for low-pass filtering of the first intermediate signal in order to obtain the subtractive mixed term of the first intermediate signal. The position determining device can analogously encompass a second low-pass filtering device for low-pass filtering of the second intermediate signal in order to obtain the subtractive mixed term of the second intermediate signal. The high-frequency components of the transmitted signal which are contained therein are thereby blocked out. A passive component, for example a lead or an RC member, through which the high-frequency additive mixed term of the first or second intermediate signal cannot pass, can also be used as a filter. A narrower bandwidth can then be used in the context of further processing. The subtractive mixed term that has been further processed furthermore contains the desired information in suitable form.

The position determining device can furthermore encompass a signal separating device for the subtractive mixed term of the first and/or second intermediate signal. The signal separating device can divide the subtractive mixed term of the first and/or second intermediate signal into a direct component that contains information regarding the transit time of a transmitted signal from a location to reflection at an object and back to the same location, and a transverse component that contains information about the transit time of a transmitted signal from a location to reflection at an object and back to a different location. The direct component and the transverse component differ in terms of their frequency and by the fact that in the transverse component, the frequency difference has a product of time and limit frequency as an argument in the cosine function, whereas the direct component has the modulation of the transmission frequency, constituting the only time-variant component, as an argument in the cosine function. A separation by means of the signal separating device based on frequency is thus made possible by defining the different frequencies of the frequency difference and the modulation of the transmission frequency.

It is furthermore possible, in particular, for the position determining device to encompass a signal separating device for the ellipse determining signal. As inferred above, the ellipse determining signal encompasses an additive and a subtractive mixed component. Preferably the additive mixed component is further processed in order to determine the transit time. For that purpose, the additive mixed component can be extracted from the ellipse determining signal by means of a high-pass filtering device functioning as a signal separating device, by high-pass filtering the ellipse determining signal.

Alternatively, instead of separating the signals into a direct and a transverse component, it is also possible to process the entire intermediate signal. Digitization and subsequent (inverse) Fourier transformation yield both the direct component and transverse component in the frequency domain. The transformed transverse component results in pulses that are shifted in the frequency domain by an amount equal to the frequency difference Delta-f. In general, care must be taken that the highest frequencies that end up in the intrinsic component are much smaller than the frequency difference, so that the two components can be properly separated in the frequency domain. Because of the wider frequency range of the direct and transverse components, a higher sampling frequency must be maintained than if only the direct component were used for position determination.

The position determining device preferably comprises an ellipse determining device for determining an ellipse, the ellipse being determinable by means of the ellipse determining device from the frequency of an additive mixed component of the ellipse determining signal. The information regarding the ellipse is present in that component.

The position determining device can comprise a trilateration device or can carry out a trilateration. The position determining device can then receive a first trilateration received signal from the first transmitting device at the first receiving device, and a second trilateration received signal from the second transmitting device at the second receiving device, in order to determine, by means of the trilateration device, a position of an object with reference to the first location and/or the second location. That position can be determined from a total of four range information items for the two objects with respect to the two transmitting and receiving stations arranged next to one another. The trilateration device is configured in particular to carry out trilateration by means of a first direct component and a second direct component. The first direct component is taken from the first subtractive intermediate signal mixed term, and/or the second direct component is taken from the second subtractive intermediate signal mixed term. If the trilateration cannot allocate pulses in the received signals to specific objects, an equivocal constellation can result.

In a further embodiment, a position of an object which is determined in particular by means of the trilateration method can be checked for plausibility. The position determining device can ascertain for that purpose whether the position of the same object lies on an ellipse that is identified by the position determining device for that object.

The ellipse determining signal contains in its time profile one pulse for each object that is sensed by the position determining device. The elapsed time from emission of a pulse from the transmitter to the pulse in the ellipse determining signal represents the path length from the transmitter of the pulse at one of the locations, via the object, to the receiver of the pulse in the ellipse determining signal which is located at the other location. From this path length, in consideration of the range of the transmitter from the receiver, the ellipse can be determined. The sensed object lies on the ellipse. If two objects are sensed, two pulses occur in the ellipse determining signal if the two objects lie on different ellipses. If the two objects lie on one ellipse, a superimposed pulse occurs. Constellations of the position information items for the two objects, which are ambiguous based on the sensing of the objects by the receivers at the same location as the respective transmitters, can exist. The measurements of the two receivers then supply pulses that are identical in time, and it is not clear which pulse belongs to which object. The objects can then be allocated to unequivocal positions by means of the information as to whether the objects lie on one ellipse or on two.

In a further embodiment the position determining device correspondingly encompasses a plausibility device with which it is possible to identify whether a position of an object, ascertained with the trilateration method, lies on an ellipse that is inferred from the ellipse determining signal. If so, the position determining device identifies that two objects in an equivocal constellation lie on the ellipse. If it is found that an object does not lie on the ellipse, the position determining device can then ascertain that two objects in an equivocal constellation lie on a minor axis of the ellipse or on a prolongation thereof.

If more than two objects are present, the proposed method can be carried out several times using combinations of two objects. Preferably the method is carried out only when a preceding trilateration method indicates that an equivocal constellation exists.

The method for determining an ellipse on which an object lies can also be carried out in order to enhance position determining accuracy. For this, the location of the ellipse can be incorporated into the calculation of the position of an object. The position error can be reduced in particular by calculating, from positions that have been determined by trilateration and ellipse determination, an optimized position. For example, an average can be calculated and/or the method of least error squares can be applied.

Preferably one transmitter and one receiver are connected into one unit. The position determining device according to an embodiment of the present invention can be constructed using at least two such units.

In a further aspect of the invention, a method that can be executed by means of the position determining device is proposed. It encompasses, as method steps, the aforementioned features of the position determining device.

DESCRIPTION OF THE FIGURES

Embodiments of the invention are depicted, merely as examples, in the appended Figures, in which:

FIG. 1A schematically depicts a radar range measuring device in the context of measurement of two objects, said device operating with a single antenna and frequency modulation;

FIG. 1B is a diagram depicting the amplitude of two pulses that have been received from the objects, plotted against the objects' range from the radar range measuring device;

FIG. 2A schematically shows a radar range measuring device, operating in accordance with the monopulse method and having two antennas, in the context of measurement of two objects;

FIG. 2B shows two diagrams that each pertain to one of the receivers and in each of which the amplitudes of two pulses that have been received from the two objects are plotted against the objects' range from the radar range measuring device;

DESCRIPTION OF PREFERRED EMBODIMENTS

Figure 3A:
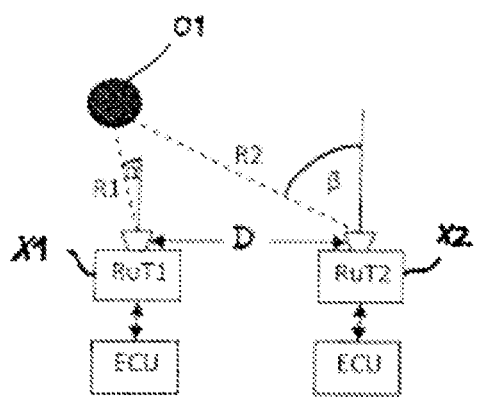
FIG. 3A schematically shows a radar range measuring device, operating according to the trilateration method and having two antennas separated from one another, in the context of measurement of an object.
Figure 3B:
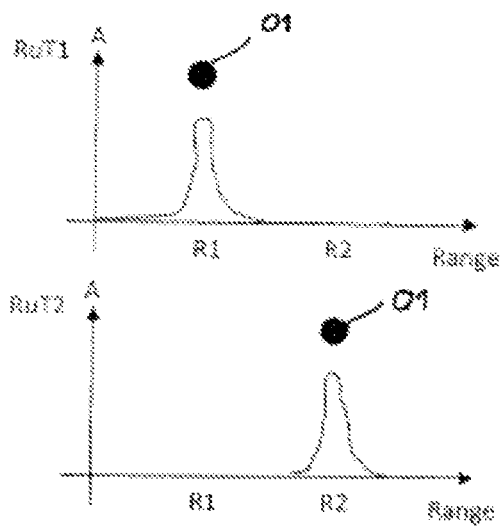
FIG. 3B shows two diagrams that each pertain to one of the receivers and in each of which the amplitude of a pulse that has been received from the object is plotted against the object's range from the radar range measuring device.
Figure 4A:
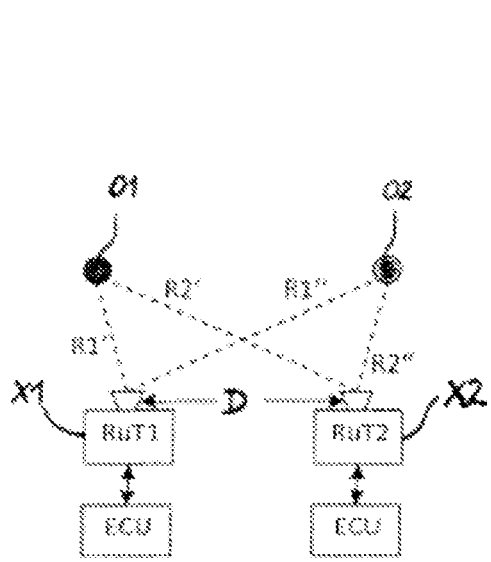
FIG. 4A schematically shows the radar range measuring device of FIG. 3 in the context of measurement of two objects that are located in an equivocal constellation.
Figure 4B:
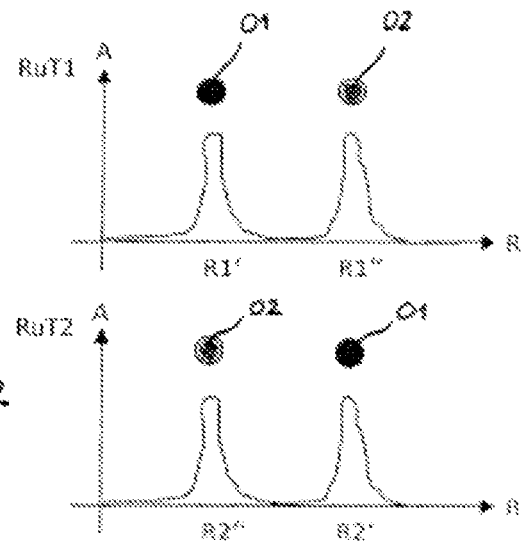
FIG. 4B shows two diagrams that each pertain to one of the receivers and in each of which the amplitudes of two pulses that have been received from the two objects are plotted against the objects' range from the radar range measuring device.
Figures 5A, 5B:
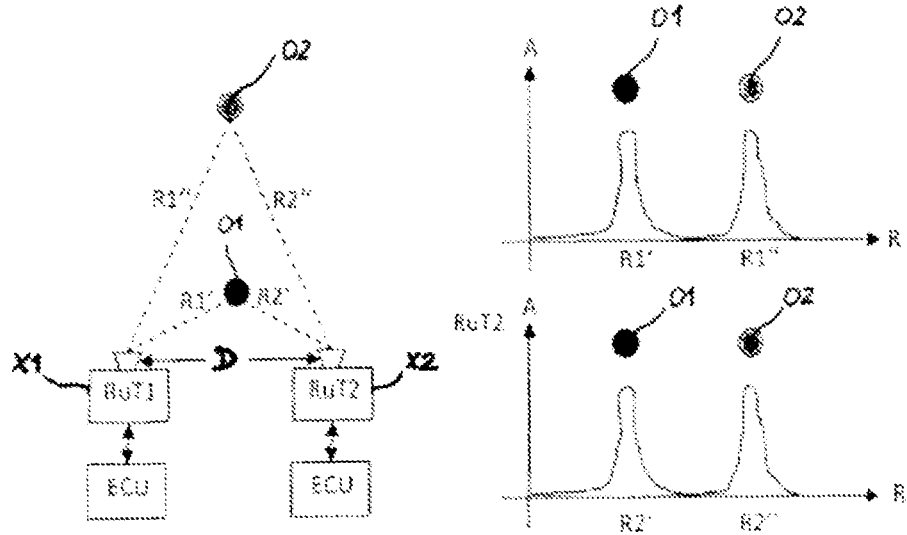
FIG. 5A schematically shows the radar range measuring device of FIG. 3 in the context of measurement of two objects that are located in another equivocal constellation.
FIG. 5B shows two diagrams that each pertain to one of the receivers and in each of which the amplitudes of two pulses that have been received from the two objects are plotted against the objects' range from the radar range measuring device.
Figure 6:
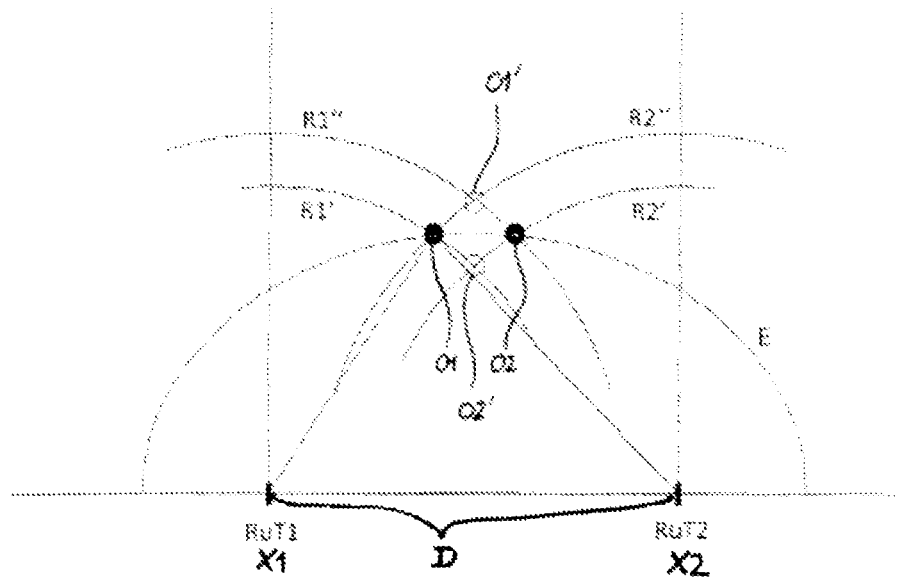
FIG. 6 schematically shows an ellipse which has been determined by means of the invention and on which two objects lie, as well as two further positions of an equivocal constellation of two objects.

FIG. 6 shows an ellipse E that has been calculated from the ellipse determining signal of the position determining device. Objects O1 and O2 lie on the ellipse. The positions of objects O1 and O2 have previously been determined using the trilateration method. Positions O1 and O2 that are shown are equivocal due to the particular characteristics of the trilateration method, and could also be the positions of virtual objects O1' and O2'. Virtual objects O1' and O2', however, do not lie on ellipse E. It is therefore possible, by means of the position determining device according to and embodiment of the present invention, to exclude the possibility that the positions of virtual objects O1' and O2' are real.

Figure 7:
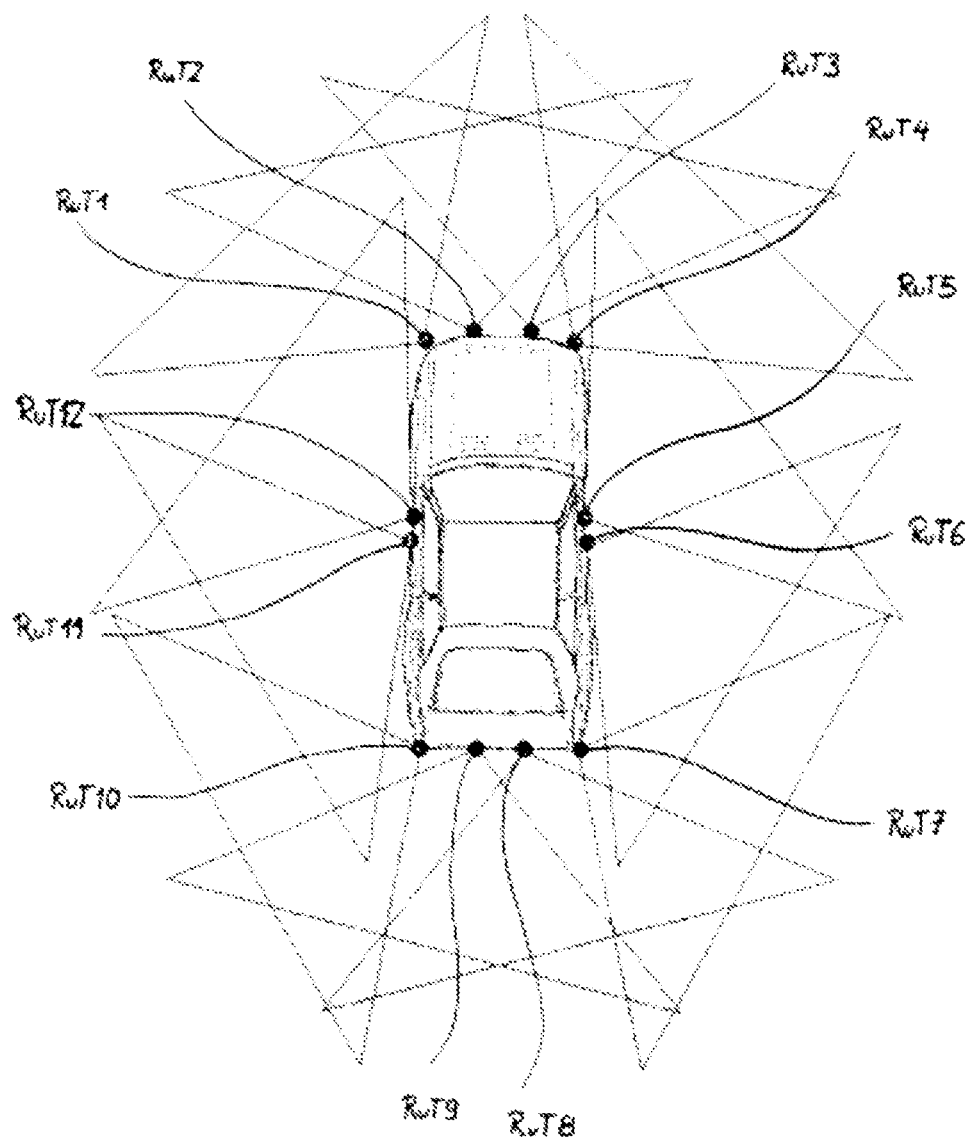
FIG. 7 shows an arrangement of six position determining devices according to an embodiment of the invention, and illumination regions thereof, on a vehicle.
Figure 8:
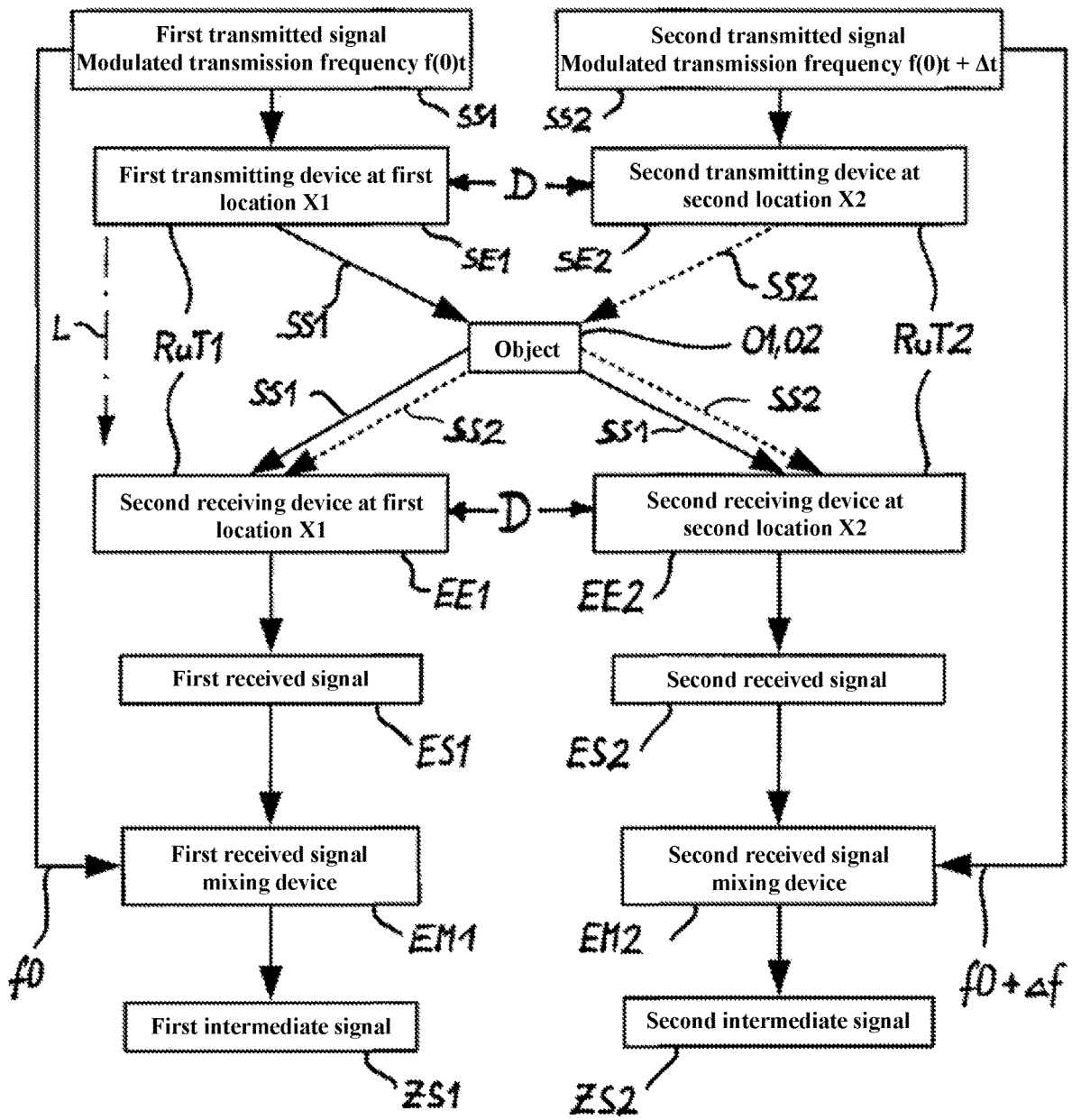
FIG. 8 shows a first part of a schematic diagram in which method steps, and signals and conversions of signals, are depicted.

FIG. 7 is a plan view of a passenger car on whose periphery twelve receiver and transmitter units RuT1 to RuT12 are arranged. Each receiver and transmitter unit RuT1 to RuT12 encompasses a transmitting device SE1, SE2 and a receiving device EE1, EE2, which are arranged at the same location. Transmitting devices SE1, SE2 and receiving devices EE1, EE2 are depicted in FIG. 8. An illumination region, depicted as a triangle, is associated with each receiver and transmitter unit RuT1 to RuT12. Adjacent illumination regions of receiver and transmitter units RuT1 to RuT12 overlap one another. The position determining device according to an embodiment of the present invention can act in these overlapping regions.

The position determining device can be used, for example, as a parking radar. The aperture angle of the illumination region is preferably equal to 110°. The regions in which the illumination regions of individual do not overlap are preferably narrow, and their length is preferably short. It is then possible here as well to ascertain the position, with good reliability, by means of the trilateration method and without the position determining device. The position of an object can be tracked upon movement of the vehicle, which can be carried out in statutory fashion in order to ascertain the position by means of the position determining device. It is also conceivable, in regions in which the position determining device cannot act, to utilize the synthetic aperture radar (SAR) method known in the existing art from a vehicle that is traveling.

FIG. 8 shows a first part of a schematic diagram in which method steps, or signals and conversions of signals, are depicted. Specifically, a first transmitted signal SS1 is transmitted from a first transmitting device SE1 that is located at location X1, and a second transmitted signal SS2 is transmitted from a second transmitting device SE2 that is located at location X2. The frequencies of transmitted signals SS1 and SS2 are each time-modulated $f0(t)$ in the same manner, and differ from one another by a frequency difference $\Delta f$. $f0$ is referred to here as an "oscillator frequency," while the time dependence (t) describes the modulation of the oscillator frequency. The two transmitted signals SS1, SS2 respectively strike one or, in particular, two objects O1, O2 and are reflected therefrom.

In FIG. 8 the propagation of transmitted signal SS1 is depicted with a solid line, and the propagation of transmitted signal SS2 with a dashed line. In the interest of simplicity, only one object is depicted in FIG. 8 and is labeled O1, O2, but the signal profile pattern depicted in FIG. 8 applies individually to each object O1, O2. Components of the two transmitted signals SS1 and SS2 are reflected respectively, by each of objects O1, O2 that is present, to a first receiving device EE1 and to a second receiving device EE2. First transmitting device SE1 and first receiving device EE1 are located at the same first location X1, while second transmitting device SE2 and second receiving device EE2 are located at the same second location X2 that is physically different from the first location. Locations X1 and X2 are at a distance D from one another. Transmitting device SE1 and receiving device EE1 can use the same antenna, and are then referred to as receiver and transmitter unit RuT1. Transmitting device SE2 and receiving device EE2 can likewise use the same antenna, and are then referred to as receiver and transmitter unit RuT2. A transit time L is drawn in schematically as a dot-dash line. This transit time L designates all transit times of signals that transit from one of transmitting devices SE1, SE2 to one of receiving devices EE1, EE2, regardless of their path and regardless of the course depicted symbolically in FIG. 8.

The first transmitted signal and the second transmitted signal from one or from two different objects O1, O2 are therefore received in superimposed fashion at receiving devices EE1, EE2. First receiving device EE1 generates a first received signal ES1, and the second receiving device generates a second received signal ES2. First received signal ES1 is mixed, in a first received signal mixing device EM1, with the oscillator frequency $f0(t)$ of first transmitted signal SS1. This yields first intermediate signal ZS1. Second received signal ES2 is mixed, in a second received signal mixing device EM2, with the oscillator frequency $f0(t)+\Delta f$ of second transmitted signal SS2. This yields second intermediate signal ZS2.

Figure 9:
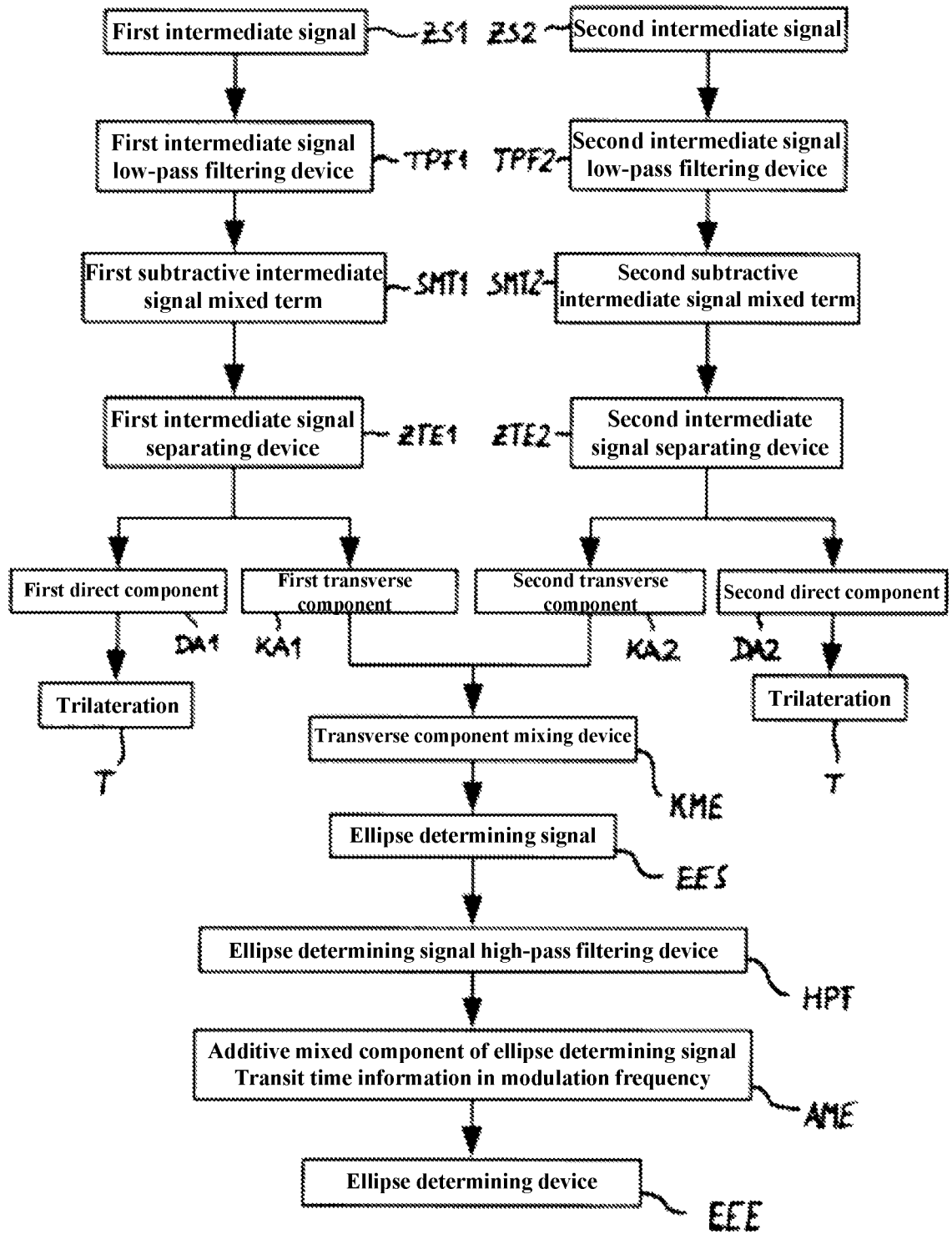
FIG. 9 shows a second part of the schematic diagram in which method steps, and signals and conversions of signals, are depicted.

FIG. 9 shows a second part of the schematic diagram in FIG. 8. Method steps for processing the first and the second intermediate signal ZS1, ZS2 are depicted in FIG. 9.

First intermediate signal ZS1 is low-pass filtered in a first intermediate signal low-pass filtering device TPF1, yielding a first subtractive intermediate signal mixed term SMT1. Concurrently therewith, second intermediate signal ZS2 is low-pass filtered in a second intermediate signal low-pass filtering device TPF2, yielding a second subtractive intermediate signal mixed term SMT2. Subtractive intermediate signal mixed terms SMT1, SMT2 each encompass a component from the respectively pertinent intermediate signal ZS1, ZS2 whose frequency is obtained from a subtraction of the received frequencies and of the oscillator frequency, so that the subtractive intermediate signal mixed terms SMT1, SMT2 contain the respective modulation frequencies of transmitted signals SS1, SS2 of FIG. 8.

Each receiving device EE1, EE2 receives two different transmitted signals SS1 and SS2 from two transmitting devices SE1 and SE2 that are located at different locations. There is therefore present, in each of the subtractive intermediate signal mixed terms SMT1 and SMT2, a respective component that derives from transmitting device SE1 or SE2 that is located at the same location as the relevant receiving device EE1 or EE2. This component is called the first or second direct component DA1, DA2. Subtractive intermediate signal mixed terms SMT1 and SMT2 furthermore each encompass a further component that derives from a respective transmitting device SE1, SE2 that is not located at the location of receiving device EE1, EE2. This component is called respectively the first and second transverse component KA1, KA2, the numbering being based on the corresponding receiving device EE1, EE2. First direct component DA1 can be separated from first transverse component KA1 in a first intermediate signal separating device ZTE1. Second direct component DA2 can be correspondingly separated from second transverse component KA2 in a second intermediate signal separating device ZTE2.

Objects O1 and O2 appear respectively as pulses in received signals ES1 and ES2, in intermediate signals ZS1 and ZS2, in subtractive intermediate signal mixed terms SMT1 and SMT2, and in direct components DA1 and DA2 and transverse components KA1 and KA2. The position of the pulses in time contains information regarding the ranges of objects O1 and O2 from the first and from the second location. This creates the possibility of carrying out a trilateration T using the first and second direct component DA1 and DA2. Because ambiguities can arise therefrom when measuring two objects, first and second transverse components KA1 and KA2 can be utilized to resolve such ambiguities.

The signal transit times, which represent the pulses in transverse components KA1 and KA2, correspond to the range from transmitting device SE1 or SE2 that is transmitting, to object O1, O2 that generates the pulse, and from there to the respective receiving device EE2, EE1 that is located at a different location from the respective transmitting devices SE1, SE2. With this information, and with the range between the two locations, it is possible to define an ellipse on which the relevant object O1, O2, which generated the pulse, is located. In order to generate, from the two transverse components KA1 and KA2, a single signal as a precursor to determination of the ellipse, namely ellipse determining signal EES, first transverse component KA1 and second transverse component KA2 are fed into a transverse component mixing device KME, the original modulation of the oscillator signal in transmitted signals SS1 and SS2 being eliminated. The information for determining the ellipse is present in a high-frequency component of ellipse determining signal EES which is produced, upon mixing of first and second transverse components KA1 and KA2, as a component in which the frequencies of first and second transverse components KA1 and KA2 are added. In order to extract this additive mixed component AME of ellipse determining signal EES from the complete ellipse determining signal EES, ellipse determining signal EES is fed into an ellipse determining signal high-pass filtering device HPF.

The invention claimed is:

1. A position determining device for determining the position of an object with reference to the position determining device,
the position determining device comprising:
a first transmitting device at a first location,
a second transmitting device at a second location,
a first receiving device at the first location, for generating a first received signal from a transmitted signal of the second transmitting device,
a second receiving device at the second location, for generating a second received signal from a transmitted signal of the first transmitting device,
wherein an illumination region of the first transmitting device overlapping with an illumination region of the second transmitting device,
wherein the first transmitting device being configured to transmit at a first transmission frequency and the second transmitting device to transmit at a second transmission frequency, the first transmission frequency differing from the second transmission frequency by a frequency difference,
wherein the first transmission frequency and the second transmission frequency being modulated in the same manner, being in particular frequency-modulated, phase-modulated, and/or amplitude-modulated, and
the first and second receiving devices being configured for determination of transit times signals that transit from one of the first and second transmitting devices to one of the first and second receiving devices,
wherein the first location and the second location are at a distance from one another, and the position determining device is configured to determine, from the transit time, an ellipse on which the object lies and which has the first location and the second location as foci,
the position determining device furthermore comprising:
a first received signal mixing device for mixing the first received signal with the first transmission frequency to generate a first intermediate signal,
a second receiving signal mixing device for mixing the second received signal with the second transmission frequency to generate a second intermediate signal, and
an intermediate signal mixing device for mixing the first intermediate signal, or a component thereof, with the second intermediate signal, or a component thereof, to generate an ellipse determining signal,
wherein the intermediate signal encompasses a direct component and a transverse component; and the entire intermediate signal is used for position determination, the direct and transverse components being separated from one another by a Fourier transform.

2. A position determining device for determining the position of an object with reference to the position determining device,
the position determining device comprising:
a first transmitting device at a first location,
a second transmitting device at a second location,
a first receiving device at the first location, for generating a first received signal from a transmitted signal (SS2) of the second transmitting device (SE2),
a second receiving device at the second location, for generating a second received signal from a transmitted signal of the first transmitting device,
wherein an illumination region of the first transmitting device overlapping with an illumination region of the second transmitting device,
wherein the first transmitting device being configured to transmit at a first transmission frequency and the second transmitting device to transmit at a second transmission frequency, the first transmission frequency differing from the second transmission frequency by a frequency difference,
wherein the first transmission frequency and the second transmission frequency being modulated in the same manner, being in particular frequency-modulated, phase-modulated, and/or amplitude-modulated, and
the first and second receiving devices being configured for determination of transit times of signals that transit from one of the first and second transmitting devices to one of the first and second receiving devices,
wherein the first location and the second location are at a distance from one another, and the position determining device is configured to determine, from the transit time, an ellipse on which the object lies and which has the first location and the second location as foci,
the position determining device furthermore comprising:

a first received signal mixing device for mixing the first received signal with the first transmission frequency to generate a first intermediate signal, a second receiving signal mixing device for mixing the second received signal with the second transmission frequency to generate a second intermediate signal, and an intermediate signal mixing device for mixing the first intermediate signal, or a component thereof, with the second intermediate signal, or a component thereof, to generate an ellipse determining signal a signal separating device for separating one component of a signal in the position determining device from another component of the signal in order to further process a desired component of the signal, the signal separating device comprising:

a first intermediate signal low-pass filtering device for low-pass filtering of the first intermediate signal in order to obtain a first subtractive mixed term of the first intermediate signal, and/or a second intermediate signal low-pass filtering device for low-pass filtering of the second intermediate signal in order to obtain a second subtractive mixed term of the second intermediate signal, and/or a first intermediate signal separating device for removing a first transverse component from the first subtractive mixed term of the first intermediate signal, and/or a second intermediate signal separating device for removing a second transverse component from the subtractive mixed component of the second intermediate signal, and/or a high-pass filtering device for high-pass filtering of the ellipse determining signal in order to extract the additive mixed component from the ellipse determining signal for further processing.

3. The position determining device according claim 1, wherein the position determining device comprises an ellipse determining device for determining an ellipse, the ellipse being determinable, by means of the ellipse determining device, from the frequency of an additive mixed component of the ellipse determining signal.

4. The position determining device according to claim 1, wherein the position determining device comprises a device for trilateration, the position determining device being configured to receive, at the first receiving device, a first trilateration received signal from the first transmitting device and, at the second receiving device, a second trilateration received signal from the second transmitting device, in order to ascertain, by means of the device for trilateration, a position of an object with reference to the first location and/or the second location, the device for trilateration being configured in particular to carry out the trilateration by means of a first direct component and a second direct component, the first direct component being removed from the first subtractive intermediate signal mixed term, and/or the second direct component being removed from the second subtractive intermediate signal mixed term.

5. The position determining device according to claim 1, wherein by means of the position determining device, a position of an object which is determined in particular by means of trilateration is checkable for plausibility by the fact that the position determining device is configured to ascertain whether the position of the same object lies on an ellipse that is determined by the position determining device for that object.

6. A method for determining a position of an object with reference to a position determining device, the position determining device comprising:
a first transmitting device at a first location,
a second transmitting device at the second location,
a first receiving device at the first location, for generating a first received signal from a transmitted signal of the second transmitting device,
a second receiving device at the second location, for generating a second received signal from a transmitted signal of the first transmitting device, an illumination region of the first transmitting device overlapping with an illumination region of the second transmitting device, the first transmitting device transmitting at a first transmission frequency and the second transmitting device transmitting at a second transmission frequency, the first transmission frequency differing from the second transmission frequency by a frequency difference, wherein the first transmission frequency and the second transmission frequency are modulated in the same manner, being in particular frequency-modulated, phase-modulated, and/or amplitude-modulated, the first received signal is mixed with the first transmission frequency, a first intermediate signal being generated, the second received signal is mixed with the second transmission frequency, a second intermediate signal being generated, the first intermediate signal being mixed with the second intermediate signal, an ellipse determining signal being generated, and a transit time of signals that transit from one of the first and second transmitting devices one of the first and second receiving devices being determined, wherein the first location and the second location are at a distance from one another; and the position determining device determines from the transit time an ellipse on which the object lies, the first location and the second location each constituting a focus of the ellipse, wherein one component of a signal is separated in the position determining device in order to further process a desired component of the signal, wherein the separation is carried out by:

the first intermediate signal being low-pass filtered in order to obtain a first subtractive mixed component of the first intermediate signal, and/or the second intermediate signal being low-pass filtered in order to obtain a second subtractive mixed component of the second intermediate signal, and/or a first transverse component being removed from the first subtractive mixed component for further processing, and/or a second transverse component being removed from the second subtractive mixed component for further processing, and/or the ellipse determining signal being high-pass filtered in order to extract an additive mixed component from the ellipse determining signal.

7. A method for determining a position of an object with reference to a position determining device, the position determining device comprising:
a first transmitting device at a first location,
a second transmitting device at the second location, a first receiving device at the first location, for generating a first received signal from a transmitted signal of the second transmitting device, a second receiving device at the second location, for generating a second received signal from a transmitted signal of the first transmitting device, an illumination region of the first transmitting device overlapping with an illumination region of the second transmitting device, the first transmitting device transmitting at a first transmission frequency and the second transmitting device transmitting at a second transmission frequency, the first transmission frequency differing from the second transmission frequency by a frequency difference, wherein the first transmission frequency and the second transmission frequency are modulated in the same manner, being in particular frequency-modulated, phase-modulated, and/or amplitude-modulated, the first received signal is mixed with the first transmission frequency, a first intermediate signal being generated, the second received signal is mixed with the second transmission frequency, a second intermediate signal being generated, the first intermediate signal being mixed with the second intermediate signal, an ellipse determining signal being generated, and a transit time of signals that transit from one of the first and second transmitting devices one of the first and second receiving devices being determined, wherein the first location and the second location are at a distance from one another, and the position determining device determines from the transit time an ellipse on which the object lies, the first location and the second location each constituting a focus of the ellipse, wherein the ellipse is determined from the frequency of the additive mixed component of the ellipse determining signal, the trilateration being carried out in particular by means of a first direct component and a second direct component, the first direct component being removed from the first subtractive intermediate signal mixed term and/or the second direct component being removed from the second subtractive intermediate signal mixed term.

8. The method according to claim 6, wherein
a component of the first received signal is received at the first receiving device from the first transmitting device, and
a component of the second received signal is received at the second receiving device from the second transmitting device, and
a position of an object with reference to the first location and/or with reference to the second location is determined from the aforesaid components of the received signals by trilateration.

9. The method according to claim 6, wherein a determined position of an object, which is determined by means of trilateration, is checked for plausibility by ascertaining whether the position of the same object lies on the ellipse that is determined for that object.

10. The position determining device according claim 2, wherein the position determining device comprises an ellipse determining device for determining an ellipse, the ellipse being determinable, by means of the ellipse determining device, from the frequency of an additive mixed component of the ellipse determining signal.

11. The position determining device according to claim 2, wherein the position determining device comprises a device for trilateration, the position determining device being configured to:
receive, at the first receiving device, a first trilateration received signal from the first transmitting device and, at the second receiving device, a second trilateration received signal from the second transmitting device,
in order to ascertain, by means of the device for trilateration, a position of an object with reference to the first location and/or the second location,
the device for trilateration being configured in particular to carry out the trilateration by means of a first direct component and a second direct component, the first direct component being removed from the first subtractive intermediate signal mixed term, and/or the second direct component being removed from the second subtractive intermediate signal mixed term.

12. The position determining device according to claim 2, wherein by means of the position determining device, a position of an object which is determined in particular by means of trilateration is checkable for plausibility by the fact that the position determining device is configured to ascertain whether the position of the same object lies on an ellipse that is determined by the position determining device for that object.

13. The method according to claim 7, wherein
a component of the first received signal is received at the first receiving device from the first transmitting device, and
a component of the second received signal is received at the second receiving device from the second transmitting device, and
a position of an object with reference to the first location and/or with reference to the second location is determined from the aforesaid components of the received signals by trilateration.

14. The method according to claim 7, wherein a determined position of an object, which is determined by means of trilateration, is checked for plausibility by ascertaining whether the position of the same object lies on the ellipse that is determined for that object.

* * * * *